Figure 1:
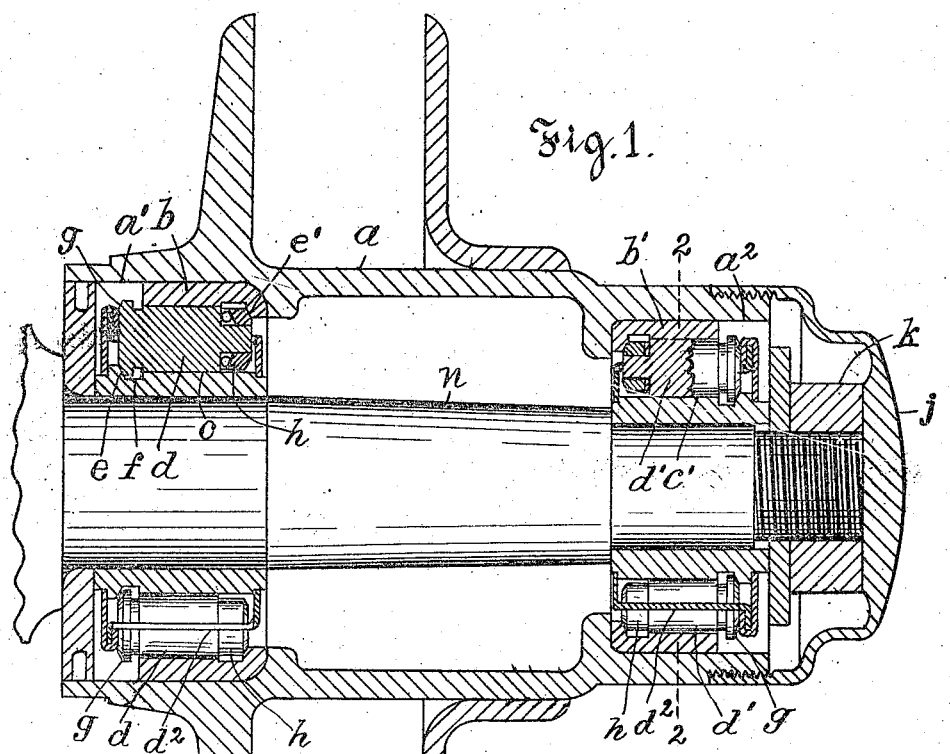

C. S. LOCKWOOD.
ROLLER BEARING TO RESIST SIDE AND END STRAIN.
APPLICATION FILED JUNE 7, 1916.

1,200,509.  Patented Oct. 10, 1916.

Inventor
Charles S. Lockwood
Thomas S. Crane, Atty

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING TO RESIST SIDE AND END STRAIN.

1,200,509.   Specification of Letters Patent.   Patented Oct. 10, 1916.

Application filed June 7, 1916. Serial No. 102,116.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearings to Resist Side and End Strain, fully described and represented in the following specification and the accompanying drawings, forming a part of the same.

This invention relates to roller-bearings in which cylindrical rolls are employed to resist lateral strain, and the object of the invention is to provide such cylindrical rolls also with means to sustain end-thrust with but a very small amount of frictional resistance. This object is secured by forming the hub and casing of the bearing respectively at their opposite ends with beveled flanges projected slightly from the hub and casing beyond the line of the roll-seats thereon, and providing one end of each roll with a beveled collar fitted to one of the said beveled flanges and providing the other end of each roll with a loose ring having a beveled shoulder fitted against the opposite beveled flange. Each roll is thus provided with means for contacting at its opposite ends with flanges upon the hub and casing respectively, and the following means are provided to reduce the friction as much as possible where the ends of the roll engage with the flanges, and to prevent any frictional resistance from twisting the roll out of parallelism with the axis of the bearing. To effect these results, the flange upon the hub is projected slightly beyond the line of the roll-seat, and the hub is provided with a groove adjacent to such flange, and the integral collar upon the end of the roll is made a little larger than the diameter of the roll to rotate in such groove and bear against such flange, whereby the bearing-surface extends partly within and partly without the line of the roll-seat, and any frictions generated by such parts of the bearing-surface balance one another and there is therefore no tendency to twist the roll out of its normal position.

The ring is made a little smaller than the body of the roll and has its outer corner beveled to fit the beveled flange upon the casing, and to facilitate the assembling of the parts. Its freedom of rotation upon the end of the roll permits the ring and roll to rotate at different speeds, to compensate for the difference in their diameters where they bear respectively upon the hub and casing. A loose washer or balls may be interposed between the ring and the adjacent end of the roll to diminish the friction between such parts. Each roll is proportioned so that its collar and ring just fit between the beveled flanges of the hub and casing and thus prevent any end movement of the casing in one direction. Where thrust is to be resisted in both directions, two such bearings are applied to the same shaft or journal, and disposed in reverse positions so that they resist thrust in either direction.

The invention will be understood by reference to the annexed drawing, in which—

Figures 2, 3, 4:
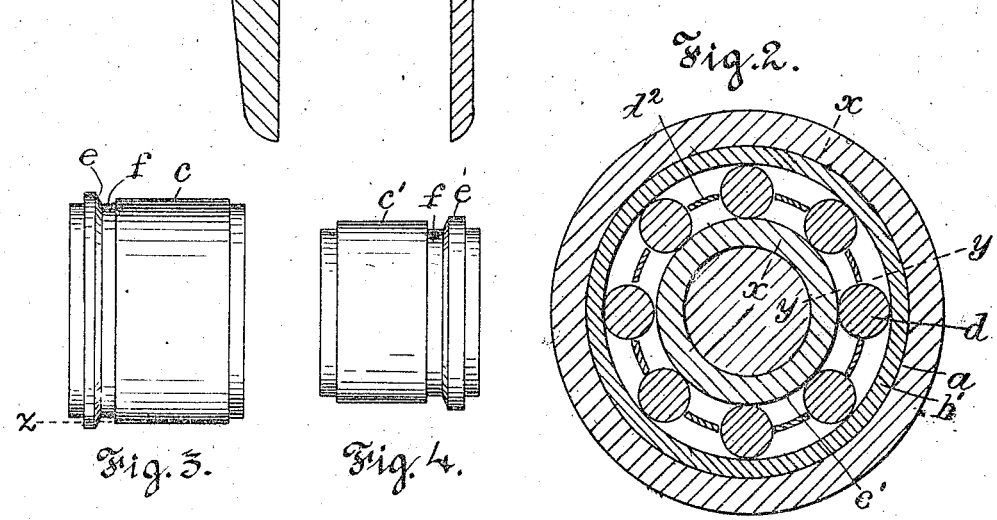
Figure 5:
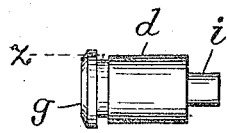
Figure 6:

Figure 1 is a longitudinal section of a wheel-center with a journal therein, the upper left-hand roll being shown in section at the center of the roll, with balls fitted behind the ring $h$; the upper right-hand roll being shown partly in section with the cage behind it, and a washer $l$ upon the stud $i$; the lower right-hand roll being shown in section on line $x$—$x$ in Fig. 2, and the lower left-hand roll being shown in section on line $y$—$y$ in Fig. 2. Fig. 2 is a cross-section on line 2—2 in Fig. 1; Fig. 3 is a side view of the hub on the left-hand end of the journal; Fig. 4 an elevation of the hub in the right-hand end of the journal; Fig. 5 is an elevation of one of the rolls for the hub of Fig. 3; and Fig. 6 is an edge view of one of the rings to fit the end of such roll.

$a$ designates the wheel-center, with chambers $a'$ and $a^2$ in its opposite ends to receive the casings $b$ and $b'$ of two roller-bearings. A journal $n$ is shown within the wheel-center and provided near its opposite ends with hubs having roll-seats $c$ and $c'$. Rolls $d$ and $d'$ are shown fitted between the respective hubs and casings. A beveled flange $e$ is formed near the outer end of each hub with an adjacent groove $f$, and a collar $g$ is formed upon the roll and beveled to fit the adjacent face of the flange $e$.

The flange $e$ projects slightly beyond the roll-seat of the hub, and the collar $g$ projects slightly beyond the body of the roll, so that the collar and flange overlap one another upon the beveled bearing-surfaces, at opposite sides of the line of the roll-seat, as shown by dotted lines $z$ in Figs. 3 and 5.

Any frictional resistance these parts may cause to the movement of the roll are practically balanced by properly proportioning the diameters of the parts, so that the acceleration caused by the larger part of the collar is offset by the retarding effect of the smaller part, which operates upon the flange near its periphery. The rolls are not therefore strained from their normal position, and do not rub against the bars of the cage $d^2$ which guides them in their movement, as shown in Fig. 2. Any end-thrust upon the wheel-center toward the flange $e$ is transmitted to the roll by a beveled flange or shoulder $e'$ upon the end of the casing $b$ opposite to the flange $e$, and the end of the roll adjacent the flange $e'$ is provided with a ring $h$ fitted loosely to a stud $i$ upon the end of the roll.

The application of the wheel-center to the journal over the bearing-rolls, is facilitated by making the ring $h$ smaller than the body of the roll, so that the casing $b$ can be drawn over such ring in removing the wheel-center from the journal, which is effected in the usual manner by taking off the cap $j$ and unscrewing the nut $k$ from the journal.

The parts of the two bearings upon the opposite ends of the journal are similar but disposed reversely to one another, so that the ends of the rolls nearest one another are provided with the rings $h$ and the ends remote from one another are provided with the collars $g$ which bear directly upon the thrust-flanges on the hubs.

As the beveled bearing-surface of the rings $h$ is smaller than the body of the roll the ring rotates at a velocity slightly different from the body of the roll, and any friction caused by its rubbing under pressure against the adjacent end of the roll (in resisting end-thrust) may be reduced by inserting an anti-friction washer $l$ between the ring and the roll-end, as shown in Fig. 1, or by forming the same parts with ball-races and inserting balls $m$, as shown in the same figure.

The beveling of the outer corners upon both ends of the cylindrical rolls is employed to avoid the grinding effect which would be produced by a sharp corner upon the collar $g$ or the ring $h$ which is liable to occur in practice, and which is easily avoided by the form shown in the drawing.

From the above description it will be seen that the construction permits the cylindrical rolls to resist end-thrust with very little friction upon the bearing-parts and without any tendency to twist the roll from its required parallelism.

Having thus set forth the nature of the invention what is claimed herein is:

1. A roller-bearing having a series of cylindrical rolls, cylindrical seats fitted to their inner and outer sides, with annular flanges upon the opposite ends of the respective seats projected beyond the line of each seat, each roll having a collar upon one end bearing against one of the said flanges, and having a central stud upon the opposite end, and a ring fitted to turn upon the stud and bearing upon the other annular flange.

2. A roller-bearing having a series of cylindrical rolls, cylindrical seats fitted to their inner and outer sides, with beveled annular flanges upon the opposite ends of the respective seats projected beyond the line of each seat, each roll having a collar upon one end and a bevel bearing against one of the said flanges, and having a central stud upon the opposite end, and a ring fitted to turn upon the stud and having a bevel fitted to the other beveled flange.

In testimony whereof I have hereunto set my hand.

CHARLES S. LOCKWOOD.